Figure 1:
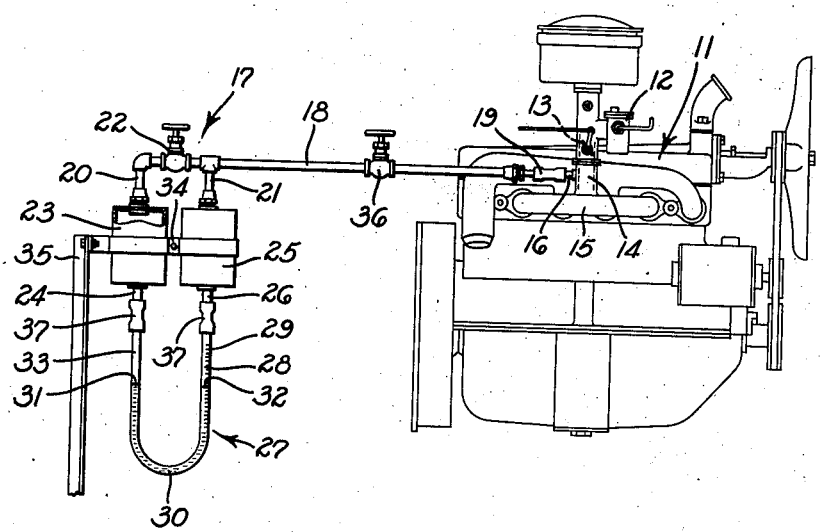

Nov. 14, 1944.   A. G. BODINE, JR   2,362,446
APPARATUS FOR INDICATING PRESSURE CHANGES OVER TIME INTERVALS
Filed June 9, 1941

INVENTOR
ALBERT G. BODINE, JR.
BY
HARRIS, KIECH, FOSTER & HARRIS

FOR THE FIRM
ATTORNEYS

Patented Nov. 14, 1944

2,362,446

UNITED STATES PATENT OFFICE 2,362,446

APPARATUS FOR INDICATING PRESSURE CHANGES OVER TIME INTERVALS

Albert G. Bodine, Jr., Burbank, Calif., assignor to The Calpat Corporation, Los Angeles, Calif., a corporation of California Application June 9, 1941, Serial No. 397,251

13 Claims. (Cl. 73—116)

My invention relates to a method of and apparatus for accurately measuring and visibly indicating slight variations in pressure, both subatmospheric and superatmospheric, and of any value, and, since it finds particular utility in testing engines and indicating variations in their energy outputs by accurately indicating slight variations in pressure responsive to variations in their energy outputs, the objects and advantages and embodiments of my invention adapted for such uses will be set forth.

In varying the factors affecting the energy output of engines, it is highly desirable for the workman to know accurately and immediately the variations in the energy output resulting from his variation of such different factors. There are various pressures, both subatmospheric and superatmospheric, developed as a result of engine operation varying in response to the energy output of the engine, and my invention contemplates immediate and visibly indicated variations in such energy output by accurately indicating small variations in such pressures.

It is the purpose of my invention to indicate variations in subatmospheric pressure developed by internal combustion engines, for example, in the vacuum manifolds, developed by steam engines, for example, in their condensers, and to indicate variations in superatmospheric pressure developed by internal combustion engines, for example, in their combustion chambers or exhaust lines, developed by compressors, for example, in their compression chambers, and developed by steam engines in their cylinder chambers; and embodiments of my invention capable of such use are illustrated in the drawing and hereinafter described.

My invention also indicates variations in the peak pressure developed in each of a plurality of cylinders of an engine and variations in the peak pressures of the different cylinders in an engine including a plurality of cylinders without stopping the operation of the engine while such indications are being provided.

Other objects of my invention include the provision of apparatus for providing extremely accurate measurements and indications of variations in absolute pressure over a range of all pressures from near absolute zero through atmospheric ranges to high superatmospheric pressures and thus, if desired, indicating variations in the energy outputs of prime movers, which apparatus is rugged in construction, positive in operation, inexpensive in manufacture, and includes a minimum of moving parts subject to wear and in which all parts are readily accessible for repair or replacement.

Still another purpose of my invention is the provision of an engine testing device which is quickly and easily installed without extensive alterations or modifications of the engine being tested.

Figure 2:
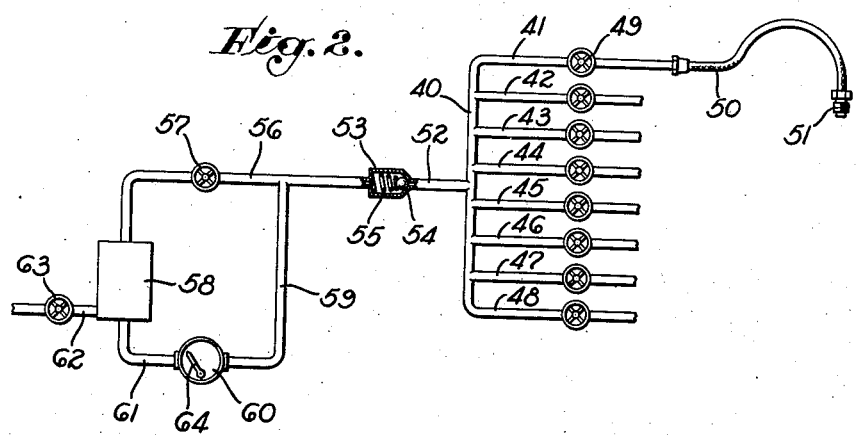

Embodiments of my invention capable of performing the foregoing objects and providing the foregoing advantages and others are described in the following specification, which may be better understood by reference to the accompanying drawing in which Fig. 1 is an elevational utility view of one embodiment of the apparatus of my invention; and Fig. 2 is a diagrammatic view of another embodiment of the apparatus of my invention.

Referring to the drawing, which is for illustrative purposes only, the numeral 11 indicates an engine, for example, such as customarily employed in an automotive vehicle, including a carburetor 12 having a butterfly control valve 13 and connected through a pipe 14 to an intake manifold 15 communicating with the cylinders of the engine 11. The pipe 14 or intake manifold 15 is customarily provided with fittings permitting the connection thereto of auxiliary equipment operated in response to a vacuum therein, such as windshield wipers or brakes, or fittings for starting primers.

In the drawing I have illustrated such a fitting as a boss 16 extending from and communicating with the pipe 14 between the carburetor 12 and intake manifold 15. A device embodying my invention, indicated generally by the numeral 17, includes a tube which may be advantageously formed of copper connected by a sleeve 19 of rubber or the like to the boss 16. The sleeve 19 may be formed to slidably fit the boss 16 and retain the tube 18 in gas-tight relationship therewith. The tube 18 is provided with two branch tubes 20 and 21 with a needle valve 22 adapted for manual actuation therebetween. The branch tube 20 is connected in gas-tight relationship with a container 23 having a connection 24 at its lower end and in communication therewith.

Similarly the branch tube 21 is connected in gas-tight relationship with a container 25 provided at its lower end with a connection 26 communicating therewith. The ends of a manometer in the form of a U-tube 27 are connected in gas-tight relationship with the connections 24 and 26. Such connections may be made by fittings 37 of rubber or the like adapted for sliding and resilient engagement with the connections 24 and 26 and the ends of the U-tube 27 or that leg 28 which is secured to the connection 26 is made of transparent material, such as glass or suitable plastic, and is provided with calibrations 29, which may be arbitrary, for comparison with the liquid level in the leg 28.

The device 17 being so connected to the engine 11, the engine is operated under conditions establishing a vacuum of constant value within the pipe 14 and the manifold 15. This may be accomplished by setting the butterfly valve 13 of the carburetor 12 in a fixed position and subjecting the engine 11 to a constant load, as by shorting out one or more of the spark plugs on the engine or imposing a constant load upon one or more of its driven wheels during their rotation.

While the engine 11 is operating and until a condition of constant vacuum within the pipe 14 and manifold 15 is established, the needle valve 22 remains open. A liquid 30 of suitable low density and high boiling point, such as kerosene, in the U-tube 27 then has its menisci 31 and 32 in the two legs of the U-tube 27 at the same level, since the two legs are subjected to a vacuum of the same value.

When there has been established in the pipe 14 and manifold 15 a vacuum of a constant value, which may be referred to as a standard pressure, the needle valve 22 is closed, trapping between the valve 22 and the meniscus 31 gas at the standard pressure. The factors affecting the energy output of the engine 11 are now varied, for example, the factors affecting the efficiency of the engine 11, such as the timing, length, or intensity of the spark employed for combustion of gases in the combustion chamber or the factors affecting the friction losses in the engine 11 may be varied during the operation of the engine. Other factors affecting the energy output of the engine 11, such, for example, as the type of fuel employed, may be varied, if desired.

As the energy output of the engine 11 is varied in response to variation of such factors, the value of the vacuum in the pipe 14 and manifold 15 is changed, the absolute pressure in the pipe 14 and manifold 15 diminishing as the energy output of the engine 11 is increased. As the absolute pressure in the pipe 14 diminishes, the pressure upon the liquid 30 in the leg 28 of the U-tube 27 is diminished and since the pressure upon the liquid in the other leg 33 remains constant as the standard pressure, the liquid 30 moves from the leg 33 to the leg 28 of the U-tube 27, the meniscus 31 lowering and the meniscus 32 rising a distance proportionate to the difference between the standard pressure in the container 23 and the leg 33 and the lesser pressure in the pipe 14, container 25, and leg 28.

Correspondingly, if the variation in the factors affecting the efficiency or energy output of the engine 11 causes a reduction in such efficiency or output, the absolute pressure within the pipe 14 and manifold 15 increases, with the result that the liquid in the leg 28 of the U-tube 27 is subjected to a pressure greater than the standard pressure exerted upon the liquid in the leg 33, so that the meniscus 32 descends and the meniscus 31 rises a distance indicating the amount of the excess of the pressure developed in the pipe 14 over the lesser standard pressure. The calibrations 29 provide a means for the workman to observe the comparative effects of variations of different factors affecting the energy output of the engine 11 and the extent of the variation of the energy output by variations of a single such factor. The liquid 30 may be colored, if desired, to facilitate the observation of its levels within the U-tube 27. The containers 23 and 25 are preferably connected by a bracket 34 to form a unitary structure, and the device 17 may be secured to suitable supports 35 adapted to rest upon the floor or any suitable part of the vehicle and to retain the device 17 in position convenient for observation by the workman during his alteration of the factors affecting the operation of the vehicle 11.

If desired, a valve 36 may be positioned in the tube 18 between the pipe 14 and the branch tube 21, so that gas under pressure may be retained in the device 17, if it is desired to discontinue the engine operation during the variation of the factors above described. The receptacle 23 is made of substantial volume compared to the volume of the branch tube 20 between the container 23, and the valve 22, and the volume of the connection 24 and leg 33 of the U-tube 27 above the meniscus 31, in order to minimize to the point where it is negligible the effect of the movement of the meniscus 31 upon the pressure within the leg 33 thereabove and the connection 24 and the branch tube 20. The containers 23 and 25 are made of sufficient volume to retain all of the liquid 30 within the U-tube 27 and thus prevent any wide variations in pressure from forcing the liquid 30 into the pipe 14.

It will be seen from the foregoing that, since the variation in the position of the meniscus 32 is in response to the difference between the standard pressure and the pressure developed as a result of variation of the energy output of the motor and is not in response to the absolute or total value of such varied pressure, the device 17 provides an extremely accurate indication of minute variations in the pressure in the pipe 14 and manifold 15 during the tuning of the engine 11. The extent of travel of the meniscus 32 in response to increments of pressure variation of small value within the pipe 14 and manifold 15 may be increased by providing the leg 28 of the U-tube 27 at any desired angle less than 90° with the vertical.

It will now be seen that by employing the embodiment of the apparatus of my invention and following the procedure above described, the workman is able to vary any of the factors affecting the energy output and immediately observe the kind and extent of the effect, even though it be extremely small, of such variation upon the energy output of the engine and thus quickly tune the motor to its maximum efficiency.

In Fig. 2 I have diagrammatically illustrated an embodiment of the apparatus of my invention adapted for indicating slight vibrations in superatmospheric pressure and for comparing the peak pressures in one cylinder under different conditions and for comparing the peak pressures in different cylinders without interruption of the operation of the engine.

The numeral 40 of Fig. 2 indicates a header or manifold pipe having eight branches, 41 to 48, connected thereto. Each of the branches 41 to 48 has a manually controlled valve 49 therein and is connected to a line 50, preferably flexible or deformable, and having at its end a fitting 51 adapted for fluid-tight connection with a cylinder wall and communication with the cylinder within the wall. A header pipe 40 is connected by a pipe 52 with a chamber 53 having therein a ball valve 54 engaged by a compression spring 55, so that it permits gas to flow from the pipe 52 through the chamber 53 while preventing gas from flowing from the chamber 53 through the pipe 52. Communicating with the chamber 53 is a primary pipe 56 having therein a needle valve 57 and communicating with a receptacle 58. A secondary pipe 59 is connected to the primary pipe 56 between the valve 57 and the chamber 53 and communicates with one side of a pressure differential gauge 60. The other side of the pressure differential gauge 60 is connected through a pipe 61 with the receptacle 58. The receptacle 58 is supplied with a bleed line 62 with a hand valve 63.

If it is desired to indicate variations in the peak pressure of one cylinder of an engine during its operation, the fitting 51 is secured to the wall of the cylinder, so that the line 50 is in communication with such cylinder, and the valve 49 in the branch 41 being opened and the valve 49 of the branches 42 to 48 being closed, and the valve 57 in the primary pipe 56 being opened and the valve 63 in the bleed line 62 being closed, during operation of the engine both sides of the pressure differential gauge 60 are subjected to the pressure developed in the cylinder under observation. The ball valve 54 permitting the passage of gas under pressure only towards the pressure differential gauge 60, this pressure on both sides of the gauge 60 will in a short while equal the peak pressure in the cylinder under observation.

The valve 57 in the primary pipe 56 is then closed, the indicating hand 64 of the gauge 60 then being in its central or twelve o'clock position. If now there be varied those factors affecting the peak pressure in the cylinder under observation, it will be seen that the gauge 60 will indicate the difference between the peak pressure developed in the cylinder under observation and the standard pressure represented by the gas trapped in the receptacle 58 and the line 61 if the pressure developed in such cylinder is in excess of such standard presure.

In order to provide an indication of a decrease in the peak pressure developed during the variation of such factors over the standard pressure of the gas so trapped, the valve 63 may be opened slightly, bleeding a small amount of gas from the receptacle 58 and the line 61 measurable by the deflection of the indicating hand 64, after the valve 57 is closed and before the gauge 60 is subjected to the pressure varying from the standard pressure. In such a manner the workman may readily observe small variations in both directions from the standard peak pressure, resulting from variations in the factors affecting the peak pressure of the cylinder under observation.

If it is desired, the fitting 51 of each of the branches 51 to 48 may be simultaneously connected to eight cylinders respectively, so that the peak pressures of all the various cylinders may be compared. Thus, if the peak pressure of the first cylinder is utilized as a standard pressure of such comparison by trapping gas under such pressure from such cylinder on the left-hand side of the ball valve 54 in the apparatus illustrated in Fig. 2, the valve 49 in the branch 41 may be closed and the valve 49 in the branch 42 connected to the second cylinder may be opened while the valve 57 in the primary pipe 56 is closed. If the peak pressure in the second cylinder is greater than the standard peak pressure, the gas under the excess pressure is passed by the ball valve 54 into communication with the right hand side of the gauge 60, causing its indicating hand 64 to give a visible indication of the excess in pressure.

If, however, the peak pressure in the second cylinder be less than the standard peak pressure referred to, no gas under pressure will be passed through the ball valve 54, and the indicating hand 64 of the gauge 60 will remain stationary in its central position.

Under such circumstances the operator may bleed a small amount of gas from the receptacle 58 by opening the valve 63, the amount of gas thus withdrawn being measured by the deflection of the indicating hand 64.

In the event that the bleeding of that quantity of gas from the container 58 represented by the maximum movement of the indicating hand 64 from its central position is insufficient to reduce the standard pressure in the receptacle 58 so that it is equal to the peak pressure developed in the second cylinder, the valve 63 is closed and the valve 57 is opened, equalizing the pressure upon the two sides of the gate 60 and causing the indicating hand 64 to return to the central position. The valve 57 being closed, the step of bleeding gas in such a measured amount from the container 58 may then be repeated. This bleeding is continued until the standard pressure in the container 58 is slightly less than the peak pressure developed in the second cylinder as indicated by the passage of gas through the ball valve 54 and the movement of the indicating hand 64 in response to the opening of the valve 49 in the branch 42 communicating with such cylinder. From the foregoing it will be seen that the total movement of the indicating hand 64 in response to the bleeding of gas from the container 58 is indicative of the excess of the peak pressure of the first cylinder over the peak pressure of the second cylinder.

In a similar manner the peak pressures of all of the cylinders may be compared, utilizing as a standard presure the peak pressure of that cylinder having developed therein the greatest pressure.

This embodiment of my invention permits the testing and tuning of an engine such as an airplane engine having in each cylinder a plurality of spark plug openings or an opening in addition to the spark plug opening, without interruption of its operation during the testing and tuning process.

From the foregoing it will be apparent that in accordance with my invention there is trapped a fluid under desired pressure which is to be employed as a standard pressure and a pressure differential indicating means simultaneously subjected to such standard pressure and to pressure differing from such standard pressure to indicate the value of the difference between such pressures. Since the pressure differential indicating means is not subjected to the full absolute value of the pressure under observation or to its difference from atmospheric pressure, but is subjected only to the small difference between the pressure under observation and a standard pressure very near thereto, such means need indicate only small variations in pressure and may therefore be made inexpensively to indicate with great accuracy slight variations in pressures ranging from those near absolute zero to superatmospheric pressures of any value.

The operation of the device can be better defined and understood if we consider the space inside the manifold 15 as a primary space. The device has a special utility in measuring small absolute pressure changes in such a manifold, but it is obviously applicable to indicating pressure changes in a fluid confined in any sort of a primary space. We may then consider the space above the meniscus 31 in the leg 33 of the U-tube as a secondary space and the space above the meniscus 32 in the other leg of the U-tube as a tertiary space. The words "primary," "secondary," and "tertiary" are used simply for convenience in identifying these spaces and making the description more exact, and not to define any function. The function of any manometer is to indicate the difference in pressure between fluids in such secondary and tertiary spaces in the manometer, and the U-tube is merely a convenient means for doing this.

The valve 22 being open, the absolute pressures in the primary, secondary, and tertiary spaces are all equal, and the manometer indicates no pressure difference between the secondary and tertiary spaces. If, however, the valve 22 is closed, the fluid in the secondary space is isolated and remains constant, but, the tertiary space being still in open communication with the primary space, the pressure of the fluid in the tertiary space varies with the pressure of the fluid in the primary space, and the manometer indicates any change of pressure in the primary space from the pressure existing in the primary space at the time the valve was closed.

It will now be seen also that my invention accurately indicates slight variations in the energy output of engines and the like developing pressures varying in response to their energy outputs and thus facilitates the testing and tuning to maximum efficiency of such engines.

Since the apparatus of my invention is extremely simple and involves few moving parts, it may be very inexpensively made of extremely rugged construction to provide most positive operation over a long period.

While I have described embodiments of my invention capable of performing the objects and providing the advantages primarily stated and adapted for use in testing and tuning engines, my invention is not limited to such embodiments or such uses, but may be provided in different forms and employed to measure any differences in pressures.

I claim as my invention:

1. In a device for indicating differences in fluid pressure in a plurality of pressure sources, the combination of: a receptacle; primary conduit means connected to said receptacle; a plurality of branch conduit means connected to said primary conduit means, one branch conduit means communicating with each pressure source; valve means in said primary conduit means; a pressure responsive means communicating with said receptacle; secondary conduit means connecting said pressure responsive means to said primary conduit means between said valve means and said branch conduit means; valve means in each of said branch conduit means; and means for withdrawing fluid from said receptacle.

2. In apparatus for testing an engine developing variations in the degree of vacuum in an inlet manifold, the combination of: a receptacle; primary conduit means communicating with said receptacle; means for removably connecting said conduit means to the manifold; valve means in said conduit means; a pressure differential responsive means communicating with said receptacle; and secondary conduit means connecting said responsive means to said primary conduit means between said valve means and the manifold.

3. In apparatus for testing an engine developing variations in the degree of vacuum in an inlet manifold, the combination of: a receptacle; primary conduit means communicating with said receptacle and adapted for removable connection to the manifold; primary and secondary valve means in said conduit means; a pressure differential responsive means communicating with said receptacle; secondary conduit means connecting said responsive means to said primary conduit means between said primary and secondary valve means.

4. In an apparatus for testing an engine developing variations in gas pressure in a chamber, the combination of: a U-tube partially filled with liquid; a receptacle connected to one leg of said U-tube; conduit means connecting said receptacle to the other leg of said U-tube and to the chamber; valve means in said conduit means between said receptacle and said other leg of said U-tube; and secondary conduit means connecting said other leg to the chamber when said valve means is closed, said receptacle and said one leg being of such capacities that the variation in pressure in said receptacle by movement of said liquid in said U-tube resulting from variations in gas pressure in the chamber when said valve means is closed is negligible.

5. In an apparatus for indicating the difference in pressures in a chamber of an engine, the combination of: primary and secondary receptacles; a U-tube containing liquid and communicating with and depending from said receptacles; primary conduit means connecting said receptacles; valve means in said conduit means; and secondary conduit means connected to said secondary receptacle and through said valve means and said primary conduit means to said primary receptacle, said secondary conduit means being adapted for releasable connection to the chamber, each of said receptacles having a volume greater than the volume of said liquid in said U-tube.

6. In an apparatus for indicating the difference in pressures in a chamber of an engine, the combination of: primary and secondary receptacles; a U-tube containing liquid and communicating with and depending from said receptacles; primary conduit means connecting said receptacles; valve means in said conduit means; secondary conduit means connected to said secondary receptacle and through said valve means and said primary conduit means to said primary receptacle, said secondary conduit means being adapted for releasable connection to the chamber, each of said receptacles having a volume greater than the volume of said liquid in said U-tube; and valve means in said secondary conduit means.

7. In an apparatus for indicating slight variations in the degree of vacuum in the intake manifold of an engine, the combination of: a primary and a secondary receptacle; a U-tube, the legs of which are so connected to said receptacles that said U-tube depends from and is supported by said receptacles, said U-tube containing a liquid; a primary conduit adapted for connecting both of said receptacles to the manifold; valve means in said primary conduit adapted for trapping gas under pressure in one of said receptacles; a secondary conduit adapted for connecting the other of said receptacles to the manifold when said valve means is closed; and supporting means connected to said receptacles and adapted for supporting said U-tube within the field of vision of the engine operator.

8. In an apparatus for indicating slight variations in the degree of vacuum in the intake manifold of an engine, the combination of: a primary and a secondary receptacle; a U-tube, the legs of which are so connected to said receptacles that said U-tube depends from and is supported by said receptacles, said U-tube containing a liquid; a primary conduit adapted for connecting both of said receptacles to the manifold; valve means in said primary conduit adapted for trapping gas under pressure in one of said receptacles; a secondary conduit adapted for connecting the other of said receptacles to the manifold when said valve means is closed; secondary valve means adapted for trapping gas under pressure in said other of said receptacles; and portable supporting means connected to said receptacles and adapted for supporting said U-tube within the field of vision of the engine operator.

9. In a device for indicating differences in fluid pressure in a plurality of pressure sources, the combination of: a receptacle; primary conduit means connected to said receptacle; a plurality of branch conduit means connected to said primary conduit means, one branch conduit means communicating with each pressure source; valve means in said primary conduit means; a pressure responsive means communicating with said receptacle; and secondary conduit means connecting said pressure responsive means to said primary conduit means between said valve means and said branch conduit means.

10. In a device for indicating differences in fluid pressure in a plurality of pressure sources, the combination of: a receptacle; primary conduit means connected to said receptacles; a plurality of branch conduit means connected to said primary conduit means, one branch conduit means communicating with each pressure source; valve means in said primary conduit means; a pressure responsive means communicating with said receptacle; secondary conduit means connecting said pressure responsive means to said primary conduit means between said valve means and said branch conduit means; and auxiliary valve means in said primary conduit means between its connection to said secondary conduit means and said branch conduit means, said auxiliary valve means being adapted for passing fluid under pressure in one direction and preventing its passage in the opposite direction.

11. In a device for indicating a change in the pressure of a primary fluid in a primary space by means of a manometer which indicates a difference in pressure between a fluid confined in a secondary space in said manometer and a fluid confined in a tertiary space in said manometer the combination of: a conduit through which said primary space is in open communication with said secondary space so that the fluid in said secondary space is at the same pressure as said primary fluid; a valve in said conduit by which the fluid in said secondary space can be isolated from said primary fluid by closing said valve, and the pressure of the fluid confined in said secondary space can be maintained constant at the pressure existing at the time of closure of said valve; a conduit through which said tertiary space is in open communication with said primary space, so that the pressure of the fluid in said tertiary space varies with the pressure of said primary fluid, and any difference between the pressure of the fluid trapped in the secondary space and that of the fluid in the primary space is indicated by the manometer; and a valve in said conduit between said primary space and said tertiary space so that at the end of any period in which a difference of pressure has been indicated on the manometer, the manometer may be isolated and its indication may be preserved for observation and recordation.

12. A device for indicating a change in pressure over a time interval in a body of fluid in a primary space, comprising: a pressure indicating device having a secondary space and a tertiary space and adapted to indicate a difference in pressure between fluids in said spaces; means for admitting fluid from said primary space to said secondary space and to said tertiary space at the beginning of the time interval; means for isolating the fluid in said secondary space and maintaining the initial pressure thereon until after the expiration of said interval; means for connecting the fluid in said tertiary space to the fluid in said primary space prior to the expiration of said interval, so that at the expiration of said interval the fluid in said secondary space will be at the pressure of the fluid in the primary space at the beginning of the interval and the fluid in the tertiary space will be at the pressure of the fluid in said primary space at the end of said interval, and the indicating device will indicate the change in pressure of the fluid in said primary space over said interval; and means for isolating said tertiary space from said primary space at any time so that the transient pressure in said tertiary space may be thereafter maintained and the pressure indicated on said pressure indicating device may be maintained and the pressure so indicated may be observed and recorded.

13. A device for indicating a change in pressure over a time interval in a body of fluid in a primary space, comprising: a pressure indicating device having a secondary space and a tertiary space and adapted to indicate a difference in pressure between fluids in said spaces; means for admitting fluid from said primary space to said secondary space and to said tertiary space at the beginning of the time interval; means for equalizing the pressure between said secondary and tertiary spaces so that the indicating device will give a zero reading; means for isolating the fluid in said secondary space and maintaining the initial pressure thereon until after the expiration of said interval; means for connecting the fluid in said tertiary space to the fluid in said primary space prior to the expiration of said interval, so that at the expiration of said internal the fluid in said secondary space will be at the pressure of the fluid in the primary space at the beginning of the interval and the fluid in the tertiary space will be at the pressure of the fluid in said primary space at the end of said interval, and the indicating device will indicate the change in pressude of the fluid in said primary space over said interval; and means for isolating said tertiary space from said primary space at any time so that the transient pressure in said tertiary space may be thereafter maintained and the pressure indicated on said pressure indicating device may be maintained and the pressure so indicated may be observed and recorded.

ALBERT G. BODINE, Jr.